UNITED STATES PATENT OFFICE.

MYRTIL KAHN AND KARL HEIDENREICH, OF ELBERFELD, GERMANY, ASSIGNORS TO THE FARBENFABRIKEN OF ELBERFELD COMPANY, OF NEW YORK.

BLACK DISAZO DYE AND PROCESS OF MAKING SAME.

SPECIFICATION forming part of Letters Patent No. 605,103, dated June 7, 1898.

Application filed December 24, 1897. Serial No. 663,406. (Specimens.)

*To all whom it may concern:*

Be it known that we, MYRTIL KAHN and KARL HEIDENREICH, doctors of philosophy, chemists, (assignors to the FARBENFABRIKEN OF ELBERFELD COMPANY, of New York,) residing at Elberfeld, Germany, have invented a new and useful Improvement in Black Disazo Dyes; and we hereby declare the following to be a clear and exact description of our invention.

Our invention relates to the production of a new class of disazo dyestuffs by combining one molecule of the diazo derivative of amidodiphenylaminsulfo-acid, (see *Berichte der Deutschen Chemischen Gesellschaft*, Vol. 24, p. 3800,) which has the formula

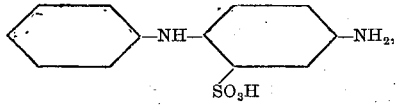

with one molecule of alpha-naphthylamin, rediazotizing the resulting amidoazo compound, and finally coupling the diazoazo compound thus obtained with one molecule of an alpha-naphthol-alpha-monosulfo-acid, such as 1.5 naphtholsulfo-acid, 1.4 naphtholsulfo-acid. The dyestuffs thus obtained are alkaline salts of acids having the formula

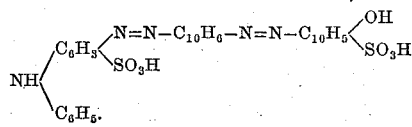

They represent dark powders soluble in water with bluish-black color, dyeing wool in acid-baths black shades which are fast to light and to milling.

In carrying out our new process practically we can proceed as follows: 26.4 kilos, by weight, of amidodiphenylaminsulfo-acid dissolved in seven hundred liters of water with the addition of seven liters of soda-lye (40° Baumé) are diazotized in the usual manner by means of seven kilos, by weight, of sodium nitrite and forty-two liters of hydrochloric acid, (22° Baumé.) The resulting diazo compound separates partially during this reaction. Subsequently the mixture is stirred into a solution prepared from 14.4 kilos, by weight, of alpha-naphthylamin, seven hundred liters of water, and fourteen liters of hydrochloric acid, (22° Baumé.) To the resulting mixture, after previously heating to about 35° centigrade, seventy liters of a sodium-acetate solution containing about twenty-five per cent. of sodium acetate $(C_2H_3O_2Na+3H_2O)$ are added with stirring. After further stirring about six hours the liquid is heated to about 50° centigrade. The resulting monoazo dyestuff is separated from the liquid by filtration. The residue remaining on the filter is dissolved in fourteen hundred liters of warm water (40° centigrade) with the addition of twelve liters of soda-lye, (40° Baumé.) This solution is cooled to 5° centigrade and mixed with a solution of 8.4 kilos, by weight, of sodium nitrite and with seventy liters of hydrochloric acid, (22° Baumé.) After stirring the mixture for about two hours the resulting diazo compound, which separates during the reaction, is filtered. Subsequently it is mixed with ice and water and stirred into a solution of 25.1 kilos, by weight, of 1.5 naphtholsulfonate of sodium in one thousand liters of water and three hundred and fifty liters of a sodium-carbonate solution containing fifteen per cent. of $Na_2CO_3$. The reaction mixture, after being stirred for about twelve hours, is heated to 80° centigrade. Finally two hundred kilos, by weight, of common salt are added, and the dyestuff thus completely separated is filtered, pressed, dried, and pulverized. It is the sodium salt of an acid having the formula

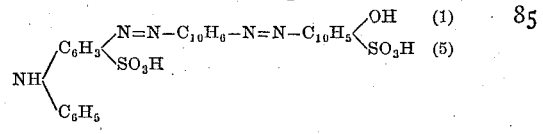

and represents a brownish-black bronzy powder soluble in water with a bluish-black color, in concentrated sulfuric acid (66° Baumé) with a greenish-black color, which changes into violet-black on adding a small quantity of ice, while a violet-black precipitate is obtained on the addition of a larger quantity of ice to the sulfuric-acid solution.

The new coloring-matter dyes unmordanted wool in acid-baths black shades fast to milling and against the action of light.

Having now described our invention and in what manner the same is to be performed, what we claim as new, and desire to secure by Letters Patent, is—

1. The process for producing new disazo dyestuffs which process consists in first combining one molecule of the diazo derivative of amidodiphenylaminsulfo-acid having the formula

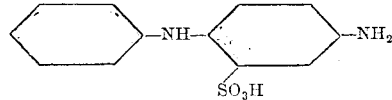

with one molecule of alpha-naphthylamin, secondly diazotizing the resulting amidoazo compound and finally coupling the diazoazo compound thus obtained with an alpha-naphthol-alpha-monosulfo-acid such as 1.4 naphtholsulfo-acid, 1.5 naphtholsulfo-acid substantially as hereinbefore described.

2. As new articles of manufacture the new disazo dyestuffs being alkaline salts of acids having the formula:

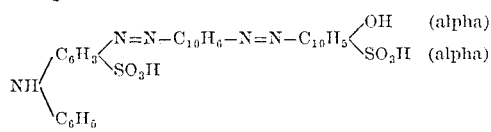

which are dark powders, soluble in water with a bluish-black color, dyeing wool in acid-baths black shades which are fast to milling and against the action of light substantially as described.

3. As a new article of manufacture the specific dyestuff being an alkaline salt of an acid having the formula

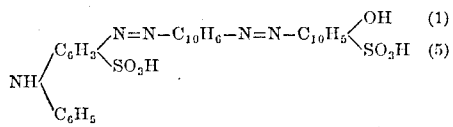

being in the form of the sodium salt a brownish-black powder, soluble in water with a bluish-black color, in concentrated sulfuric acid (66° Baumé) with a greenish-black color which changes into violet-black on adding a small quantity of ice while a violet-black precipitate is obtained on the addition of a larger quantity of ice to the sulfuric-acid solution, dyeing wool in acid-baths black shades fast to milling and against the action of light substantially as described.

In testimony whereof we have signed our names in the presence of two subscribing witnesses.

MYRTIL KAHN.
KARL HEIDENREICH.

Witnesses:
R. E. JAHN,
OTTO KÖNIG.